(12) United States Patent
Fukao

(10) Patent No.: US 9,056,597 B2
(45) Date of Patent: Jun. 16, 2015

(54) BICYCLE CONTROL DEVICE

(75) Inventor: Kazutaka Fukao, Osaka (JP)

(73) Assignee: Shimano Inc., Osaka (JP)

( * ) Notice: Subject to any disclaimer, the term of this patent is extended or adjusted under 35 U.S.C. 154(b) by 2 days.

(21) Appl. No.: 13/248,185

(22) Filed: Sep. 29, 2011

(65) Prior Publication Data

US 2013/0081506 A1 Apr. 4, 2013

(51) Int. Cl.
*F16C 1/10* (2006.01)
*B60T 7/10* (2006.01)
*B62M 25/04* (2006.01)
*B62K 23/06* (2006.01)

(52) U.S. Cl.
CPC ............ *B60T 7/102* (2013.01); *Y10T 74/20396* (2015.01); *Y10T 74/20438* (2015.01); *B62M 25/04* (2013.01); *B62K 23/06* (2013.01)

(58) Field of Classification Search
USPC .......................... 74/473.3, 500.5, 501.6, 502.2
See application file for complete search history.

(56) References Cited

U.S. PATENT DOCUMENTS

| | | | | |
|---|---|---|---|---|
| 5,012,692 A * | 5/1991 | Nagano | ....................... | 74/473.14 |
| 5,257,683 A | 11/1993 | Romano | | |
| 5,400,675 A | 3/1995 | Nagano | | |
| 2004/0089092 A1 * | 5/2004 | Campagnolo | ................. | 74/502.2 |
| 2007/0012137 A1 | 1/2007 | Dal Pra' | | |
| 2007/0193389 A1 * | 8/2007 | Kawakami | .................... | 74/502.2 |
| 2008/0121066 A1 * | 5/2008 | Takebayashi et al. | ........ | 74/502.2 |
| 2008/0230664 A1 * | 9/2008 | Sean | ............................. | 248/214 |
| 2012/0297919 A1 * | 11/2012 | Fukao et al. | .................. | 74/502.2 |
| 2012/0318094 A1 * | 12/2012 | Fukao et al. | .................. | 74/502.2 |
| 2012/0318095 A1 * | 12/2012 | Fukao et al. | .................. | 74/502.2 |
| 2012/0318096 A1 * | 12/2012 | Fukao et al. | .................. | 74/502.2 |

FOREIGN PATENT DOCUMENTS

| | | |
|---|---|---|
| EP | 0661205 A1 | 12/1994 |
| JP | 5-82786 U | 11/1993 |
| JP | 5-319355 A1 | 12/1993 |
| TW | 433235 U | 5/2001 |
| TW | 200848317 A | 12/2008 |
| TW | 200920650 A | 5/2009 |
| WO | 94/01318 A1 | 1/1994 |

OTHER PUBLICATIONS

European Search Report of corresponding EP Application No. 12 16 9427.7 dated Jan. 17, 2013.

\* cited by examiner

*Primary Examiner* — Vicky Johnson
(74) *Attorney, Agent, or Firm* — Global IP Counselors

(57) ABSTRACT

A bicycle control device is provided with a bracket, a first lever and a second lever. The first lever is pivotally mounted to the bracket on a first pivot axle for pivotal movement about a first pivot axis defined by the first pivot axle. The second lever is pivotally mounted to the bracket on a second pivot axle for pivotal movement about a second pivot axis defined by the second pivot axle. The second pivot axle is disposed inside the first pivot axle.

13 Claims, 14 Drawing Sheets

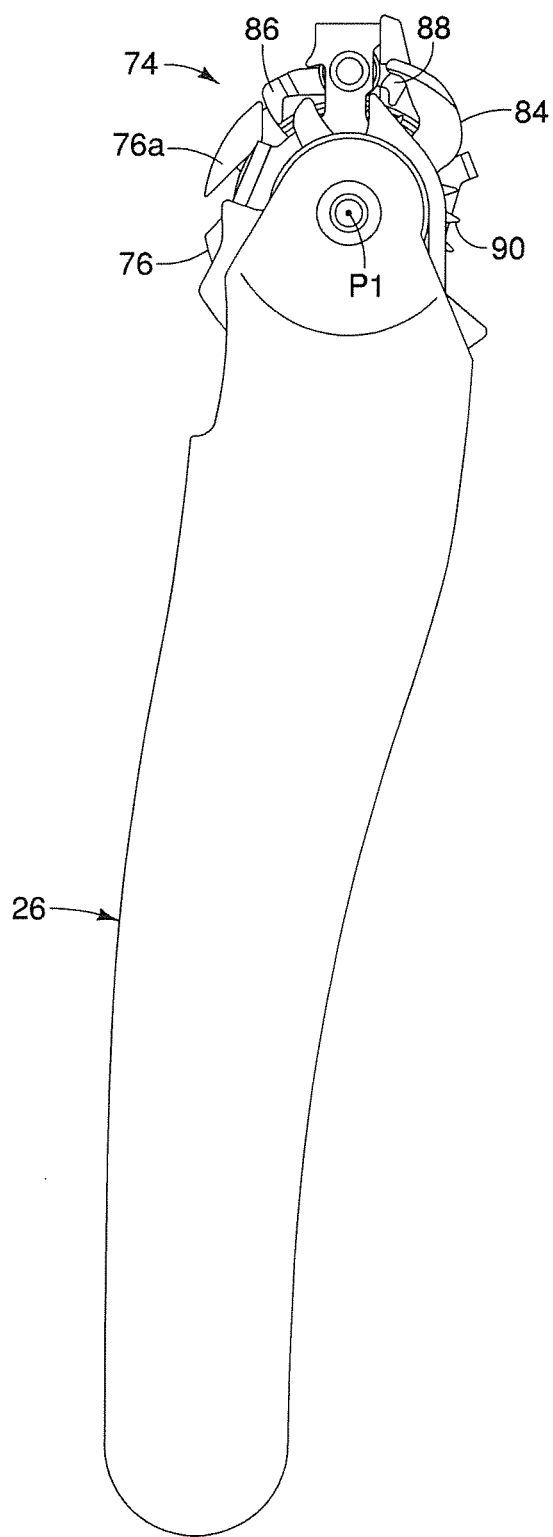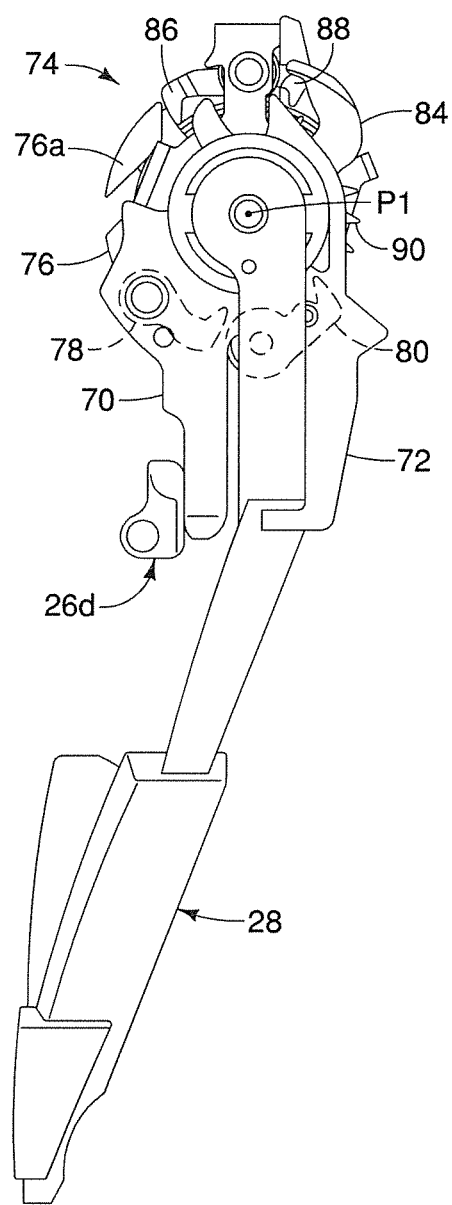
FIG. 16
FIG. 17

BICYCLE CONTROL DEVICE

BACKGROUND

1. Field of the Invention

This invention generally relates to a bicycle control device. More specifically, the present invention relates to a bicycle control device having first and second operating levers that has a compact arrangement of the first and second operating levers.

2. Background Information

A bicycle control device is usually provided for the rider to manually change gears of the drive train. These control devices are often called a bicycle shifter. Most mechanical bicycle control devices (shifters) use control cables that connects the bicycle control devices to the gear changing devices for shifting. Some bicycle control devices use a single operating lever to perform both upshifting operations and downshifting operations, while other bicycle control devices use a first operating lever to perform upshifting operations and a second operating lever to perform downshifting operations. Also some bicycle control devices integrate braking into one of the operating levers. In the case of a road bicycle with a dropdown handlebar, the bicycle control devices that have a lever for the dual function of shifting and braking are sometimes referred to as a brifter. In some cases, a brake lever that is integrated into to the shifter such that the brake lever has the dual function. Examples of brake/shift operating devices are disclosed in U.S. Pat. No. 5,400,675 to Nagano (assigned to Shimano, Inc), U.S. Pat. No. 5,257,683 to Romano (assigned to Campagnolo) and U.S. Publication Patent No. 2007-0012137 to Dal Pra' (assigned to Campagnolo).

SUMMARY

One aspect present in this disclosure is to provide a bicycle control device having first and second operating levers that has a compact arrangement of the first and second operating levers.

In view of the state of the known technology, a bicycle control device is proved that comprises a bracket, a first lever and a second lever. The first lever is pivotally mounted to the bracket member on a first pivot axle for pivotal movement about a first pivot axis defined by the first pivot axle. The second lever is pivotally mounted to the bracket member on a second pivot axle for pivotal movement about a second pivot axis defined by the second pivot axle. The second pivot axle is disposed inside the first pivot axle.

These and other objects, features, aspects and advantages of the present bicycle control device will become apparent to those skilled in the art from the following detailed description, which, taken in conjunction with the annexed drawings, discloses one embodiment of the bicycle control device.

BRIEF DESCRIPTION OF THE DRAWINGS

Referring now to the attached drawings which form a part of this original disclosure:

FIG. 16 is a front view of selected parts of the right bicycle control device illustrated in FIGS. 1 to 7 as viewed along the axes of the first and second operating levers with the bracket removed;

FIG. 17 is a front view of selected parts of the right bicycle control device illustrated in FIGS. 1 to 7 as viewed along the axes of the first and second operating levers with the bracket and the first (brake/shift) operating lever both removed.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
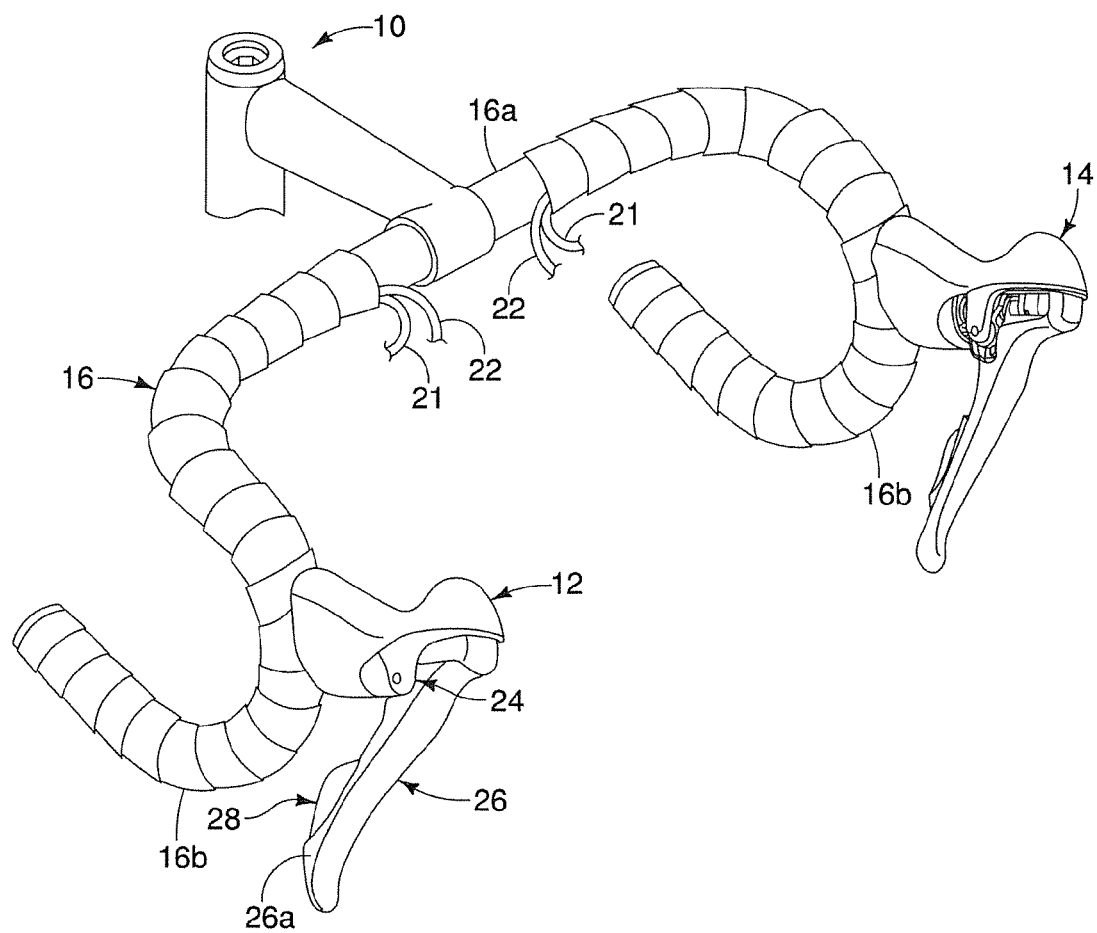
FIG. 1 is a front perspective view of a portion of a bicycle equipped with a pair of bicycle control devices coupled to a drop type handlebar in their installed positions in accordance with one illustrative embodiment.

Referring initially to FIG. 1, a portion of a bicycle 10 that is equipped with a pair of bicycle control devices 12 and 14 is illustrated in accordance with one illustrative embodiment. The bicycle control devices 12 and 14 are mounted on a drop down handlebar 16 in accordance with the illustrated embodiment as seen in FIG. 1. The drop down handlebar 16 typically includes a straight cross portion 16a and a pair of downwardly curved portions 16b. The straight cross portion 16a connects upper ends of the downwardly curved portions 16b. The bicycle control devices 12 and 14 are mounted to the downwardly curved portions 16b of the drop down handlebar 16.

The bicycle control device 12 is a right hand side control device operated by the rider's right hand to operate a first brake device (not shown) and a first gear shifting device (e.g., a cable operated rear derailleur). The bicycle control device 14 is a left hand side control device operated by the rider's left hand to operate a second brake device (not shown) and a second gear shifting device (e.g., a cable operated front derailleur). The first and second gear shifting devices are part of a conventional bicycle driving system that is used to shift a bicycle chain for changing speeds of the drive train in a relatively conventional manner. In the illustrated embodiment, the bicycle control device 12 is operatively coupled to a gear shifting device via a shift control cable 21 and to a brake device via a brake control cable 22. In the illustrated embodiment, the bicycle control device 14 is operatively coupled to a gear shifting device via a shift control cable 21 and to a brake device via a brake control cable 22.

Figure 2:
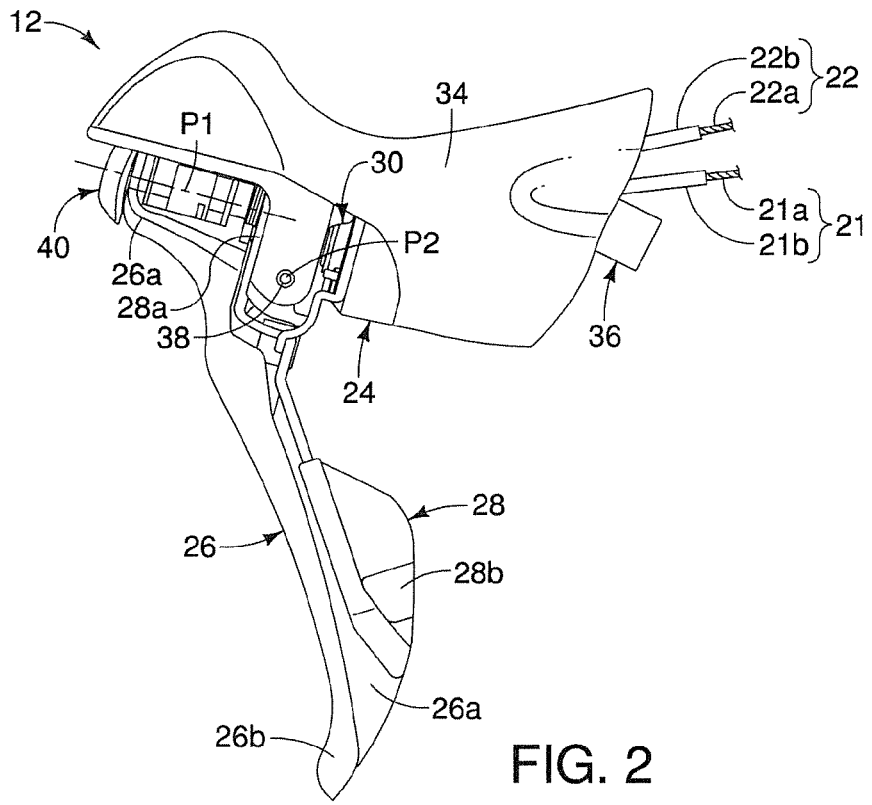
FIG. 2 is an inside elevational view of the right bicycle control device illustrated in FIG. 1 with the first (brake/shift) operating lever and the second (release) operating lever in their rest (non-operating) positions.
Figure 3:
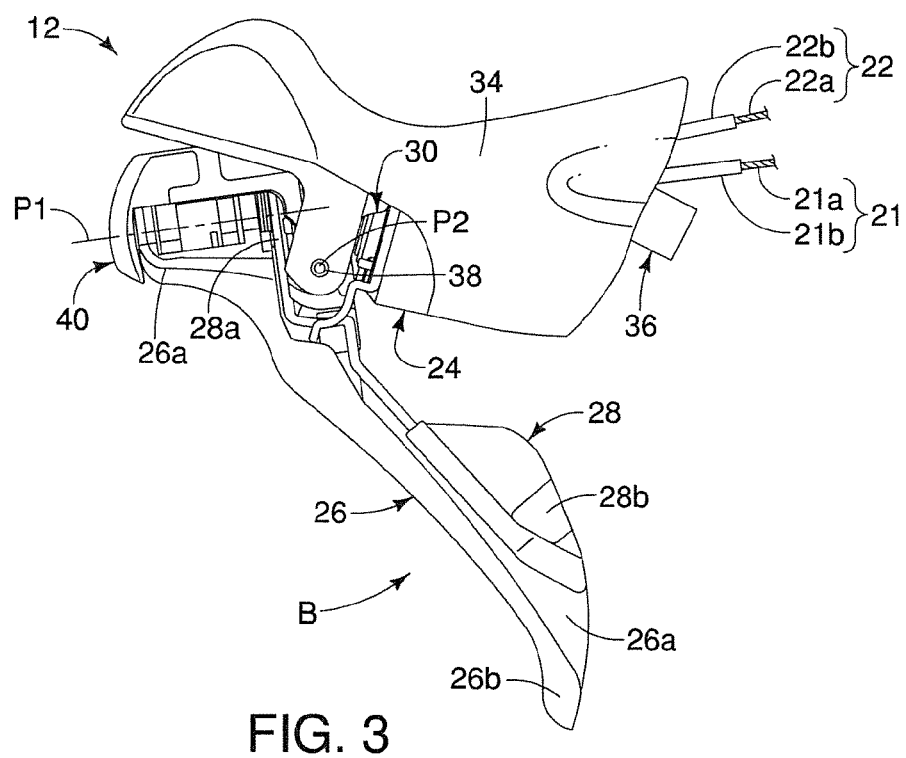
FIG. 3 is an inside elevational view of the right bicycle control device illustrated in FIGS. 1 and 2 with the first (brake/shift) operating lever pivoted to a braking position.

As seen in FIGS. 2 and 3, preferably, the control cables 21 and 22 are conventional bicycle operating cables that have an outer case covering an inner wire. In other words, each of the control cables 21 and 22 are Bowden type cables basically include an inner wire slidably received within an outer case. For example, as seen in FIG. 3, the shift control cable 21 has an inner wire 21a with an outer case 21b covering the inner wire 21a, while the brake control cable 22 has an inner wire 22a with an outer case 22b covering the inner wire 22a. The inner wire 21a constitutes a connecting member that operatively connects the bicycle control device 12 to the first gear shifting device for shifting the corresponding gear shifting device in response to operation of the bicycle control device 12.

While the bicycle control devices 12 and 14 are illustrated as bicycle control device that combine both shifting and braking using Bowden type cables, the bicycle control devices 12 and 14 are not limited to a bicycle control device that combine both shifting and braking using Bowden type cables. For example, the bicycle control devices 12 and 14 can be configured for performing only shifting. Also the bicycle control devices 12 and 14 can be configured for performing braking using a hydraulic operating unit. Moreover, instead of using Bowden type cables for shifting, the bicycle control devices 12 and 14 can be to operate electrical switches.

In this embodiment, as best seen in FIGS. 2 and 3, the bicycle control device 12 basically includes a bracket 24, a first operating lever 26 and a second operating lever 28. The first and second operating levers 26 and 28 are pivots relative to the bracket 24 for performing shifting operations. In other words, the first and second operating levers 26 and 28 are examples of user operated levers that are used for operating the shift unit 30 as discussed below. In particular, the bicycle control device 12 is further provided with a shift unit 30 that is disposed an interior space or internal cavity 32 of the bracket 24. The first and second operating levers 26 and 28 operatively coupled to the shift unit 30 for performing shifting operations as discussed below. In particular, the first operating lever 26 and the second operating lever 28 are both pivotally mounted with respect to the bracket 24 about a shift pivot axis P1 to operate the shift unit 30. The first operating lever 26 is also configured to perform a braking operation as discussed below. In the illustrated embodiment, the first operating lever 26 and the second operating lever 28 are trigger type levers that are biased to the rest positions in a conventional manner. The term "rest position" as used herein refers to a state in which the part (e.g., the first operating lever 26 and the second operating lever 28) remains stationary without the need of a user holding the part in that state corresponding to the rest position.

As seen in FIGS. 2 and 3, the bracket 24 constitutes a base member that basically supports the first and second operating levers 26 and 28 and the shift unit 30 of the bicycle control device 12. Typically, the bracket 24 is made of a rigid, hard plastic material, since riders sometimes grip the bracket 24 and lean on the bracket 24 during riding. It is desirable to provide a comfortable feeling for the rider's hand while the rider is gripping the bracket 24. Thus, the bracket 24 has a rigid main body that is covered with a soft outer elastomeric grip cover 34. The grip cover 34 partially covers the bracket 24 as seen in FIGS. 2 and 3. In particular, the grip cover 34 is stretched over a gripping portion of the bracket 24. The precise construction of the bracket 24 depends on the construction of the shift unit 30, which can be a variety of types such a cable operated one as shown or an electrical one (not shown). The bracket 24 is sometimes formed as a one-piece member, while in other cases, the bracket 24 is formed a rigid main body part and one or more panel parts. Since a variety of shift units can be used for the shift unit 30 in the bicycle control device 12, the precise construction of the bracket 24 will not be discussed herein.

The bracket 24 is provided with a handlebar mounting structure 36 at a rear end for mounting to one of the downwardly curved portions 16b of the drop down handlebar 16. The bracket 24 is a stationary member when mounted to the handlebar 16 by the handlebar mounting structure 36. Since the bracket 24 is fixed to the drop down handlebar 16 by the handlebar mounting structure 36, the bracket 24 constitutes a fixed member with respect to the drop down handlebar 16. The handlebar mounting structure 36 is preferably a conventional band clamp or similar structure that is used in a road shifter for gripping the drop down handlebar 16. Since the handlebar mounting structure 36 can be any suitable mounting structure, the handlebar mounting structure 36 will not be discussed or illustrated in detail herein.

Figure 4:
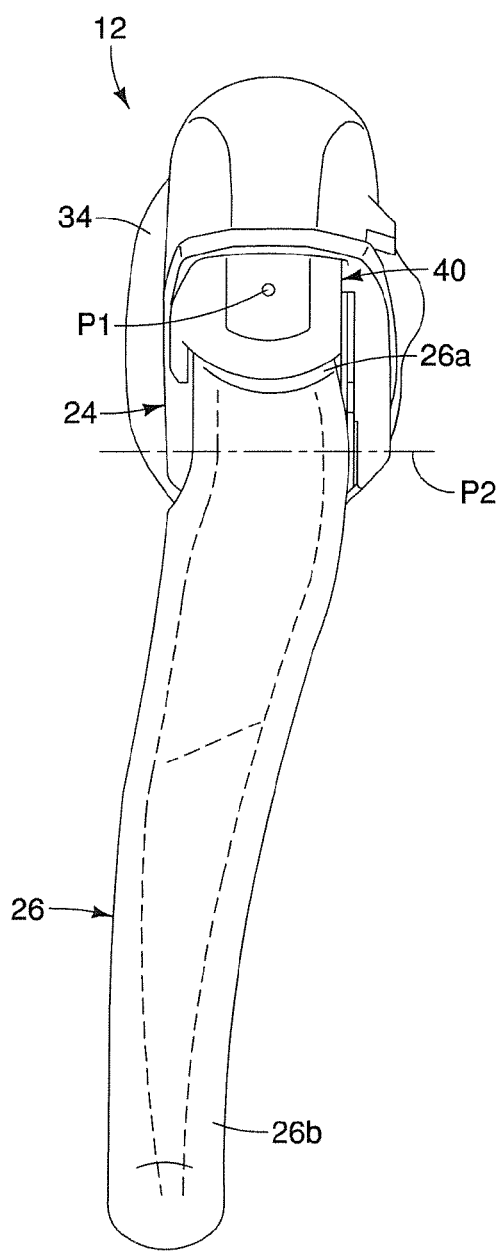
FIG. 4 is a front elevational view of the right bicycle control device illustrated in FIGS. 1 to 3 with the first (brake/shift) operating lever and the second (release) operating lever in their rest positions.
Figure 5:
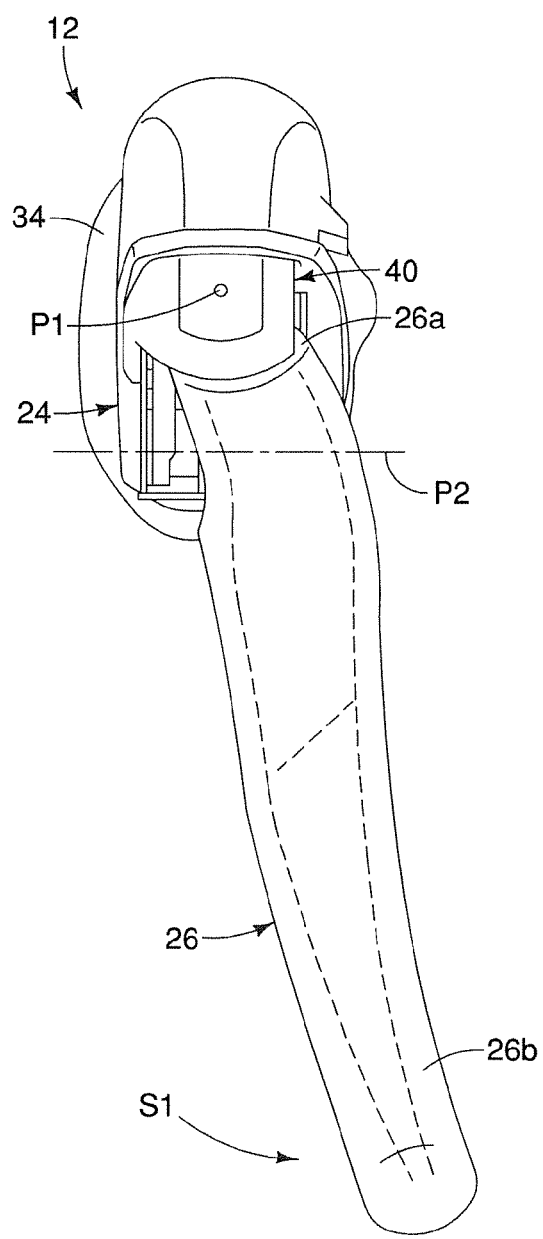
FIG. 5 is a front elevational view of the right bicycle control device illustrated in FIGS. 1 to 4 with the first (brake/shift) operating lever moved to a cable pulling position.

As seen in FIGS. 2 to 5, the first operating lever 26 is used to perform both a braking operation and a shilling operation (e.g., a cable pulling or winding operation). Thus, the first operating lever 26 constitutes a brake/shift operating lever. The second operating lever 28 moves together with the first operating lever 26 as the first operating lever 26 is operated. FIGS. 2 and 3 illustrate a braking operation being performed by the first operating lever 26, while FIGS. 4 and 5 illustrate a shifting operation being performed by the first operating lever 26. FIGS. 2 and 4 illustrate the first operating lever 26 in the rest position, while FIGS. 3 and 5 illustrate the first operating lever 25 in an operated position.

As seen in FIG. 3, the first operating lever 26 is pivotally mounted relative to the bracket 24 by a pivot pin 38 mounted to the bracket 24. The pivot pin 38 defines a brake pivot axis P2 that extends transverse to the lateral surfaces of the bracket 24 to perform a braking operation. This pivotal movement of the first operating lever 26 from the rest position to the braking position along a non-shift operating path B pulls the inner wire 22a of the brake cable 22 to operate a brake device (not shown). Thus, the first operating lever 26 functions as a brake lever.

As seen in FIGS. 4 and 5, the first operating lever 26 is pivotally mounted relative to the bracket 24 perform a shifting operation (e.g., cable pulling operation). FIG. 4 illustrates the first operating lever 26 in the rest position, while FIG. 5 illustrates the first operating lever 26 in a shift operated position. The shift pivot axis P1 is non coaxial with respect to the brake pivot axis P2. The first operating lever 26 pivots relative to the bracket 24 along a plane that is transverse to a braking plane of the first operating lever 26. Specifically, the rider pivots the first operating lever 26 about the shift pivot axis P1 in a direction S1 towards a bicycle longitudinal center plane for shifting and the rider pivots the first operating lever 26 about the brake pivot axis P2 in a direction generally parallel to the bicycle longitudinal center plane for braking. This pivotal movement of the first operating lever 26 from the rest position to the shift operated position pulls the inner wire 21a of the shift cable 21. Thus, the first operating lever 26 functions as a cable pulling lever.

Figure 6:
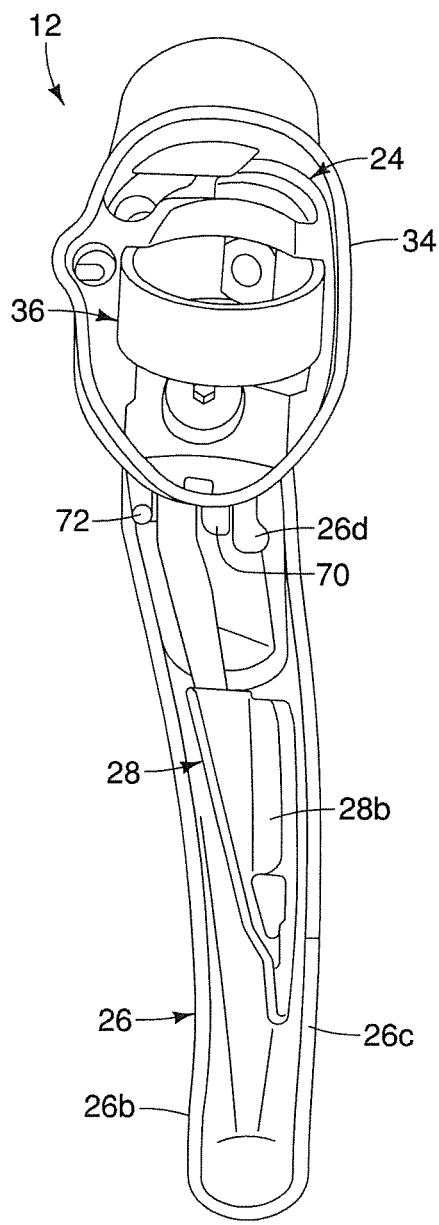
FIG. 6 is a rear elevational view of the right bicycle control device illustrated in FIGS. 1 to 5 with the first (brake/shift) operating lever and the second (release) operating lever in their rest positions.
Figure 7:
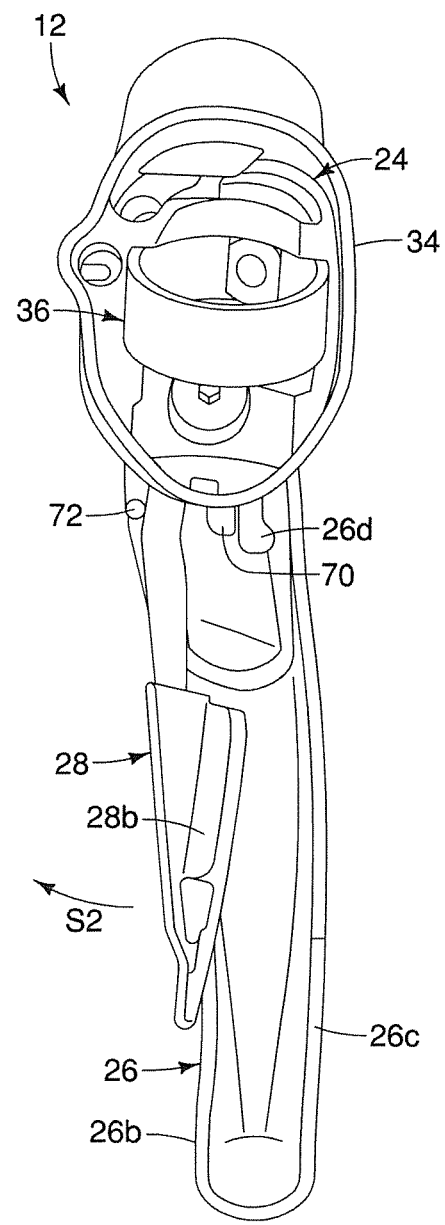
FIG. 7 is a rear elevational view of the right bicycle control device illustrated in FIGS. 1 to 6 with the second (release) operating lever moved to a cable releasing position.

As seen in FIGS. 6 and 7, the second operating lever 28 is operatively coupled to the shift unit 30 for performing shifting operations (i.e., a cable releasing operations). FIG. 6 illustrates the second operating lever 28 in the rest position, while FIG. 7 illustrates the second operating lever 28 in a shift operated position. In particular, the second operating lever 28 is pivotally mounted on the first operating lever 26 such that the second operating lever 28 pivots relative to the first operating lever 26 about the shift pivot axis P1 (see FIGS. 2 and 3) between the rest position and the shifting position. Thus, the first operating lever 26 and the second operating lever 28 have coincident shift pivot axes.

The second operating lever 28 only performs shifting operations. The first operating lever 26 remains stationary or substantially stationary while the second operating lever 28 is pivoted about the shift pivot axis P1 so that only the second operating lever 28 is performing a shifting operation. The first operating lever 26 contacts the second operating lever 28 during pivotal movement of the first operating lever 26 about the shift pivot axis P1 to perform a shifting operation. However, the second operating lever 28 does not operate the shift unit 30 when the first operating lever 26 is pivoted about the shift pivot axis P1 to perform a shifting operation. In the illustrated embodiment, the second operating lever 28 releases the inner wire 21a from the shift unit 30 when the second operating lever 28 is pivoted about the shift pivot axis P1 in a direction S2 towards the center longitudinal plane of the bicycle 10. Thus, the second operating lever 28 constitutes as a cable releasing lever.

Figure 8:
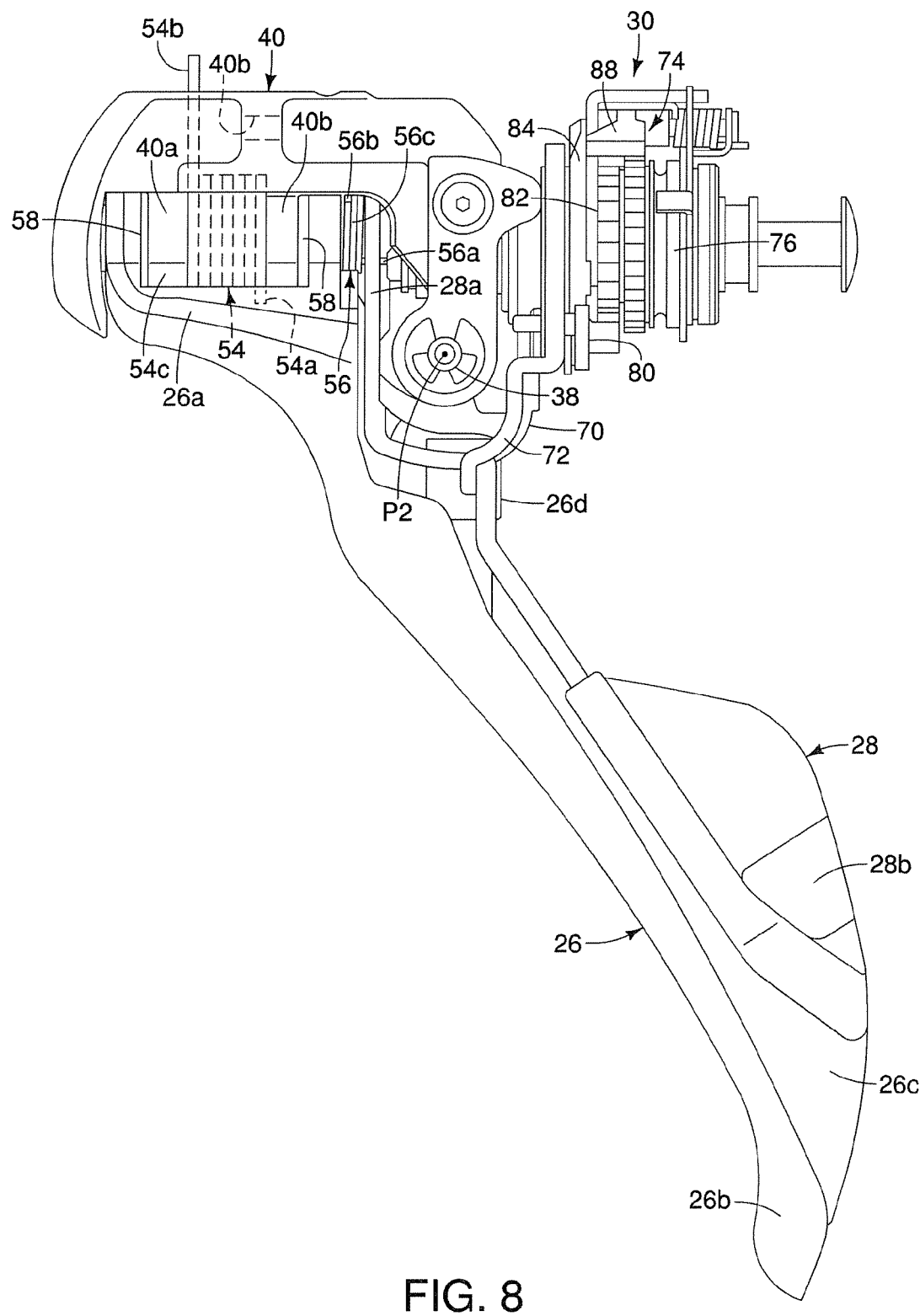
FIG. 8 is an inside elevational view of the right bicycle control device illustrated in FIGS. 1 to 7 with the bracket removed.

As seen in FIG. 8, a mounting member 40 is pivotally attached to the bracket 24 by the pivot pin 38 that defines the brake pivot axis P2. The first operating lever 26 and the second operating lever 28 are movably supported on the bracket 24 by the mounting member 40. In particular, the first operating lever 26 has a mounting end 26a that is pivotally attached to a pair of attachment flanges 40a and 40b of the mounting member 40. The second operating lever 28 also has a mounting end 28a that is pivotally attached to the attachment flanges 40a and 40b of the mounting member 40. The first operating lever 26 has a user operating portion 26b that is disposed outside of the bracket 24 for the rider to pivot the first operating lever 26 about the shift pivot axis P1. Similarly, the second operating lever 28 has a user operating portion 28b that is disposed outside of the bracket 24 for the rider to pivot the second operating lever 28 about the shift pivot axis P1. The first operating lever 26 has an abutment 26c that contacts the user operating portion 28b of the second operating lever 28 when the first operating lever 26 is pivoted about the shift pivot axis P1 to perform a shifting operation.

Figure 9:
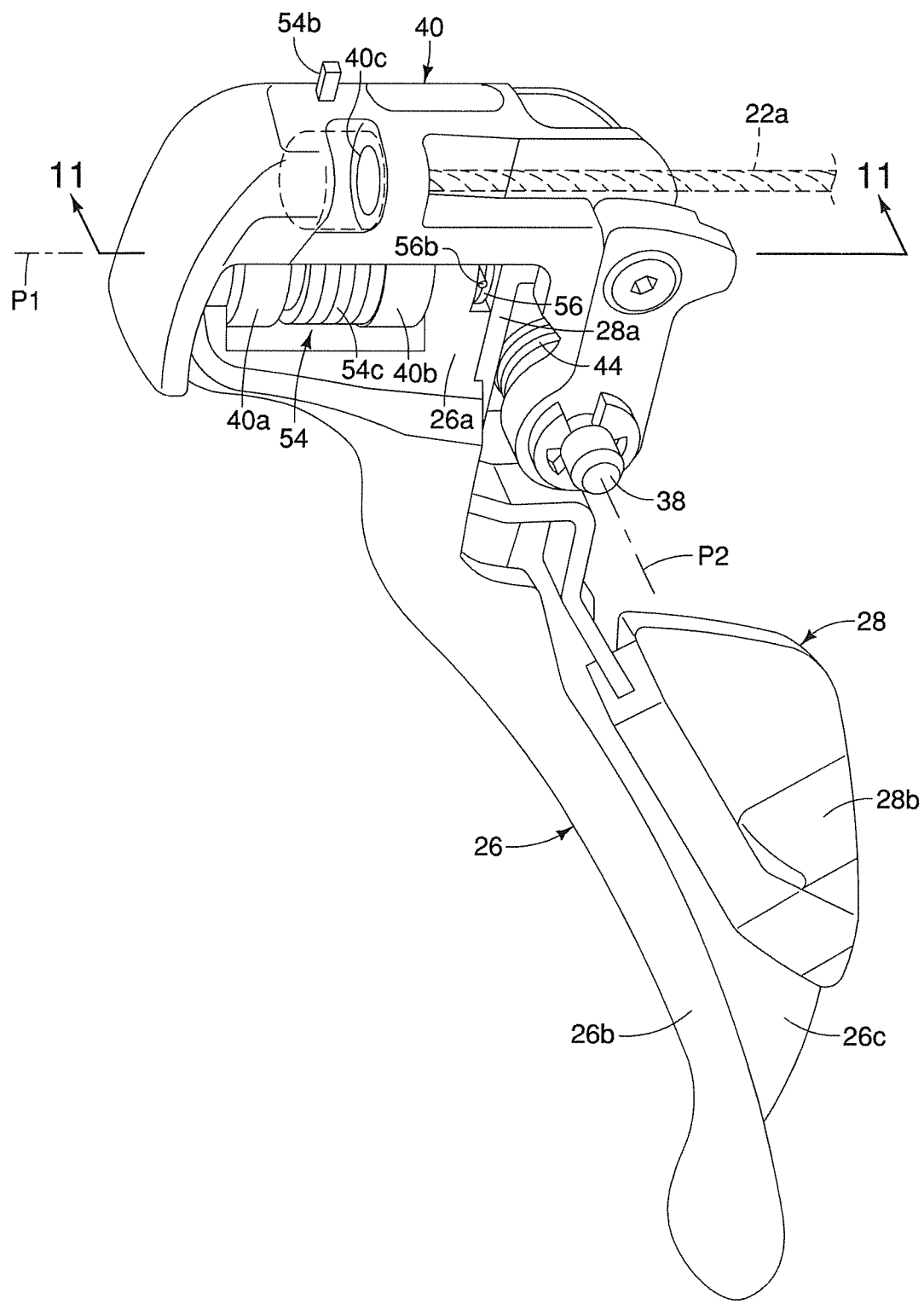
FIG. 9 is a front perspective view of selected parts of the right bicycle control device illustrated in FIGS. 1 to 7 with the bracket and the shift unit both removed.

As seen in FIG. 9, the mounting member 40 has a cable attachment hole 40c for attaching the inner wire 22a of the brake control cable 22. The pivot pin 38 is located in holes of pivot attachment portions of the bracket 24 and the mounting member 40 such that the inner wire 22a of the brake control cable 22 is pulled as the first operating lever 26 pivoted on the pivot pin 38 from the rest position (FIG. 2) to the braking position (FIG. 3). A biasing element 44 is provided between the bracket 24 and the mounting member 40. The biasing element 44 is arranged for biasing the mounting member 40 and the first operating lever 26 to the rest position (FIG. 2). In the illustrated embodiment, the biasing element 44 is a torsion spring with its coiled portion disposed on the pivot pin 38 and its first and second free ends contacting the bracket 24 and the mounting member 40, respectively.

Figure 11:
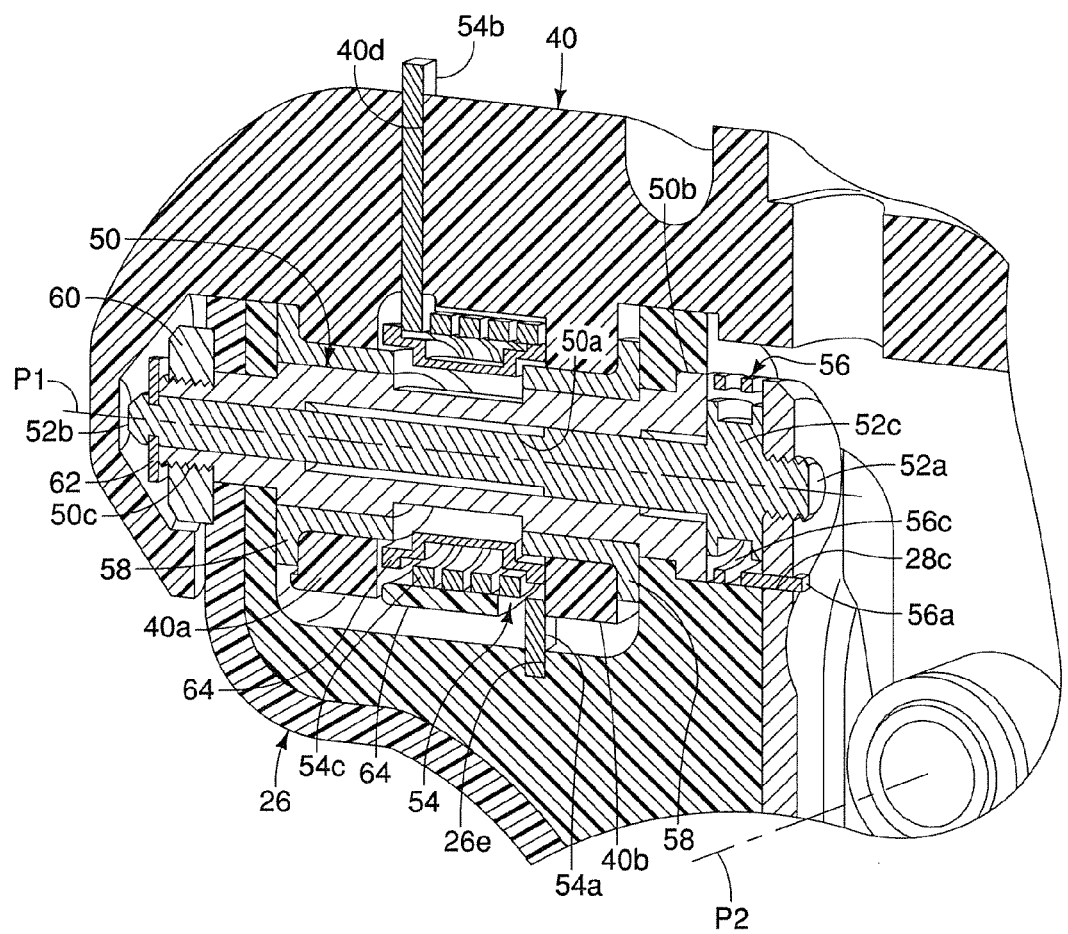
FIG. 11 is a partial cross sectional view of a portion of the right bicycle control device illustrated in FIGS. 1 to 7 as seen along section line 11-11 of FIG. 9.

As seen in FIG. 11, the first operating lever 26 is pivotally mounted to the mounting member 40 on a first pivot axle 50 for pivotal movement about the shift pivot axis P1. In the illustrated embodiment, the shift pivot axis P1 corresponds to a first pivot axis defined by the first pivot axle 50. The second operating lever 28 is pivotally mounted to the mounting member 40 on a second pivot axle 52 for pivotal movement about the shift pivot axis P1. In the illustrated embodiment, the shift pivot axis P1 corresponds to a second pivot axis defined by the second pivot axle 52. The second pivot axle 52 is disposed inside a center bore of a tubular shaft 50a of the first pivot axle 50. Thus, the first and second pivot axes of the first and second pivot axles 50 and 52 are coincident in the illustrated embodiment. However, the first and second pivot axles 50 and 52 can be configured such that their first and second pivot axes are not coincident, if needed and/or desired.

Figure 10:
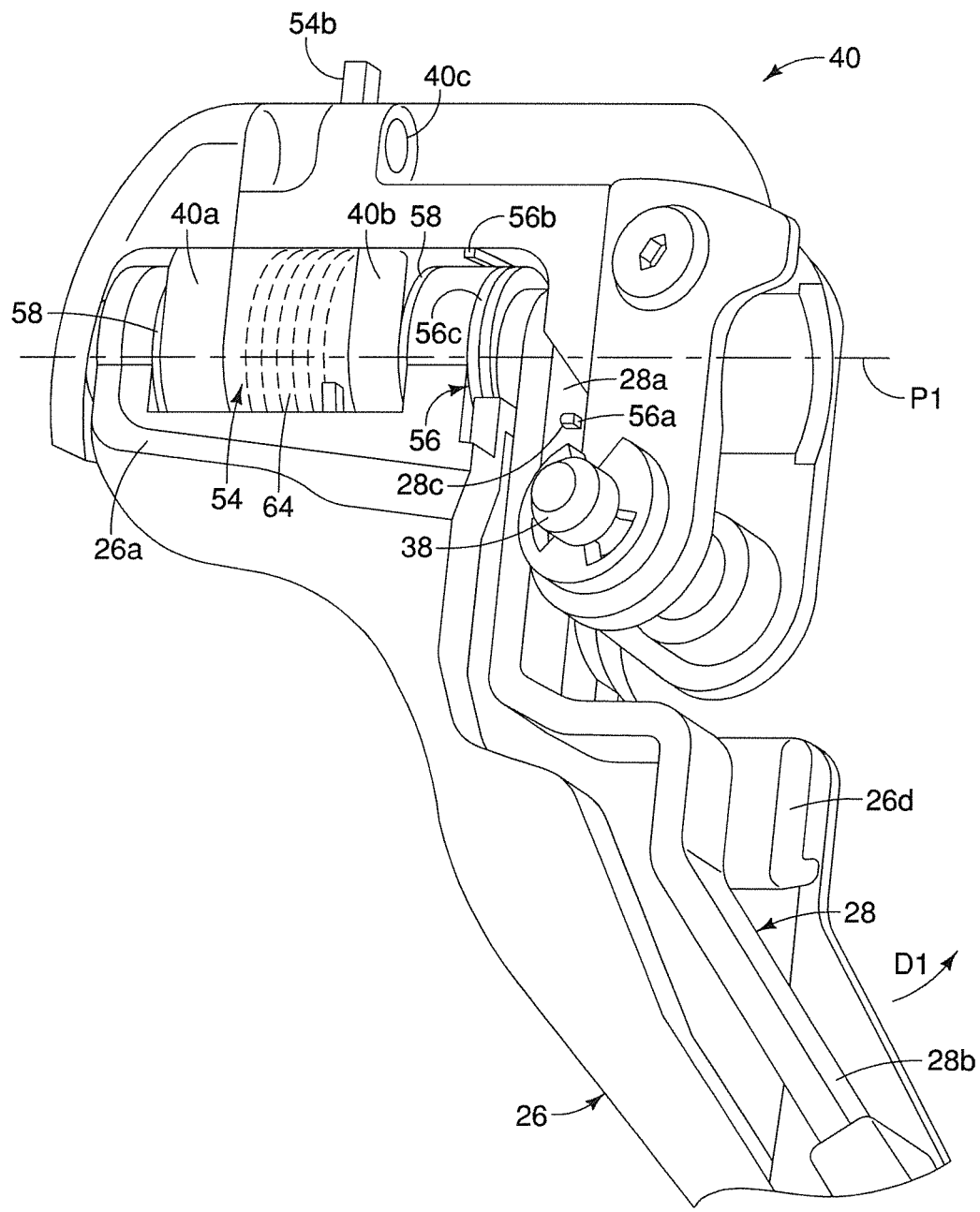
FIG. 10 is a rear perspective view of selected parts of the right bicycle control device illustrated in FIGS. 1 to 7 with the bracket and the shift unit both removed.
Figure 12:
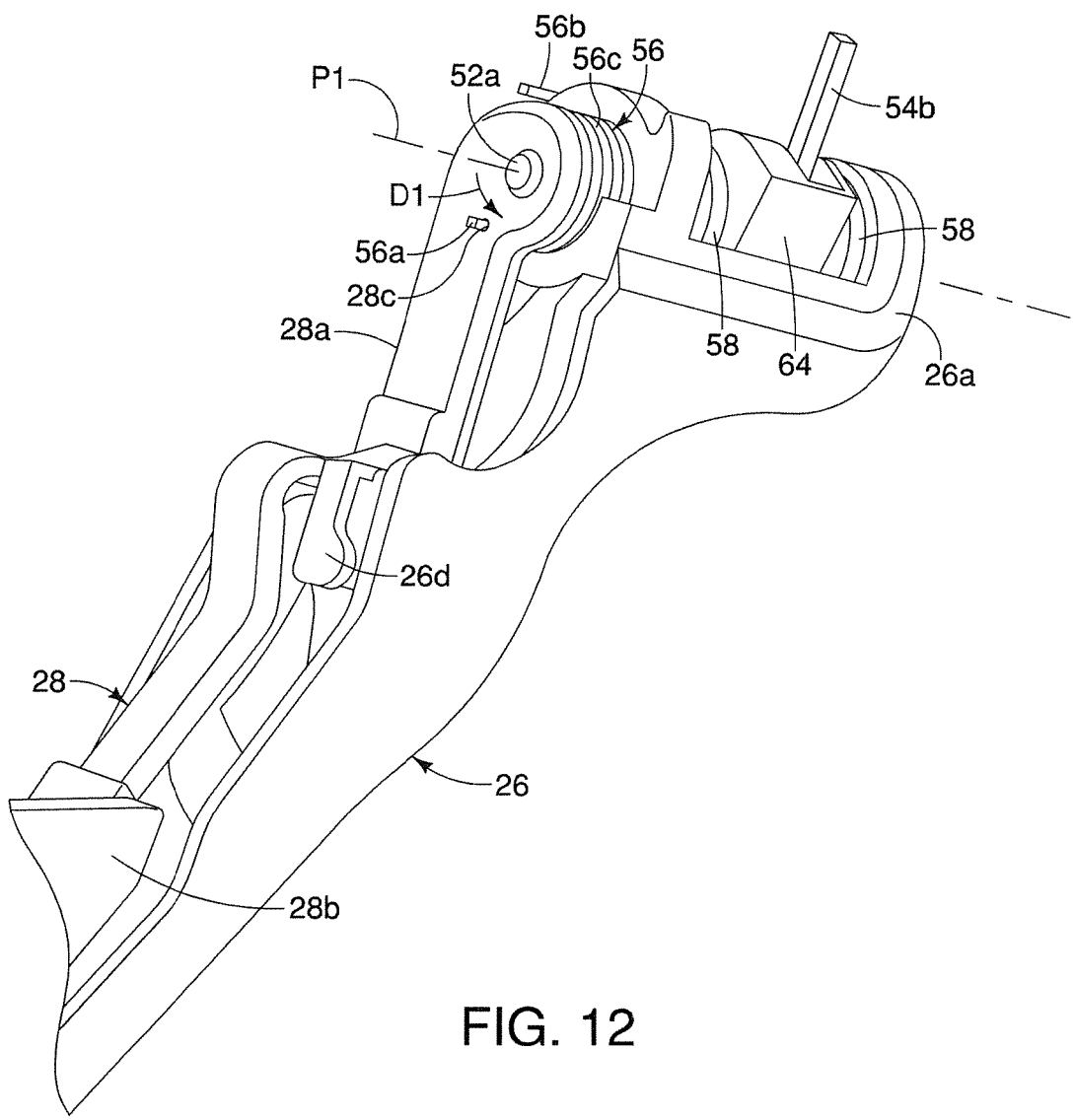
FIG. 12 is a partial rear perspective view of a portion of selected parts of the right bicycle control device illustrated in FIGS. 1 to 7 with selected parts removed for purposes of illustration.
Figure 13:
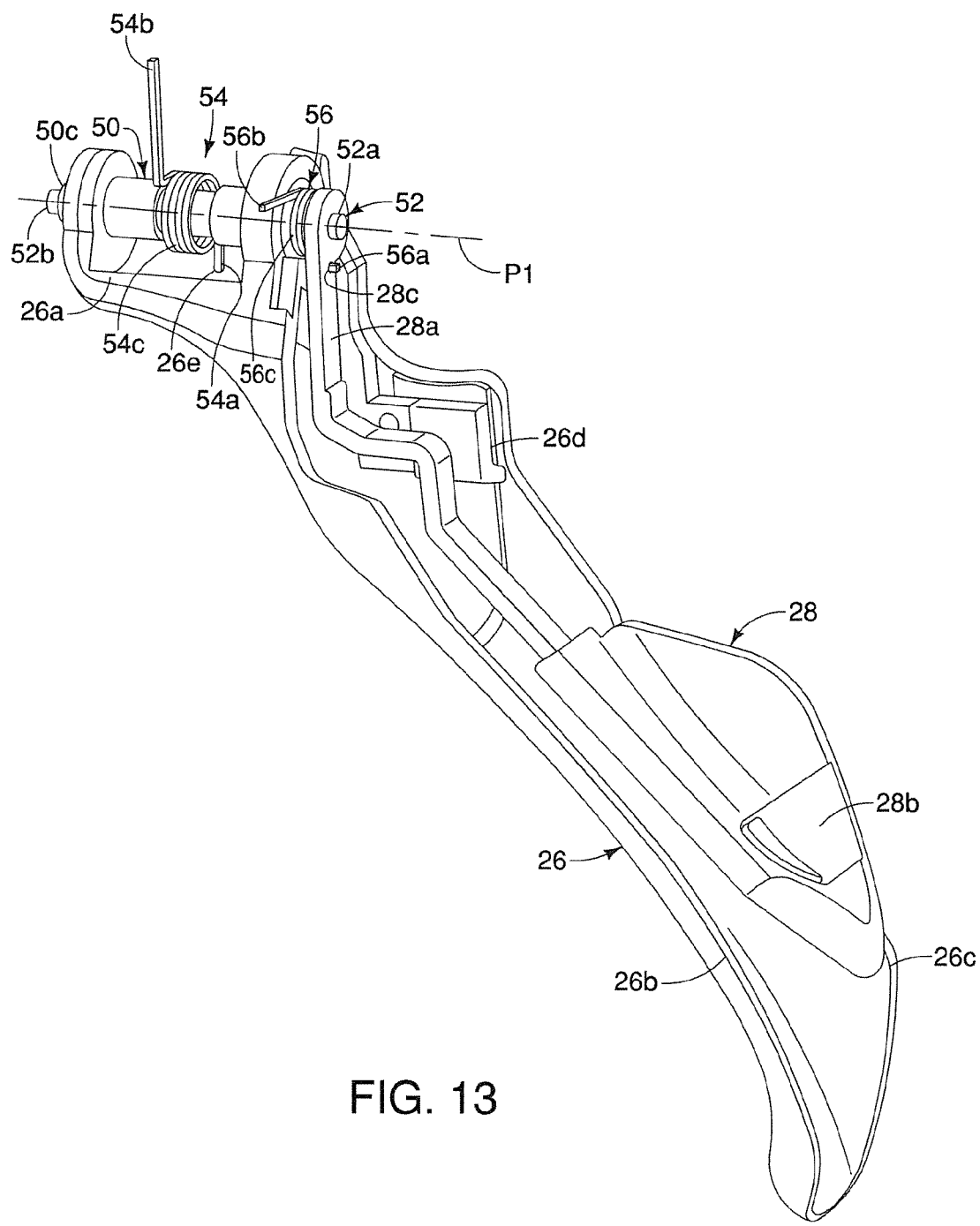
FIG. 13 is a rear perspective view of the first and second operating levers of the right bicycle control device illustrated in FIGS. 1 to 7.
Figure 14:
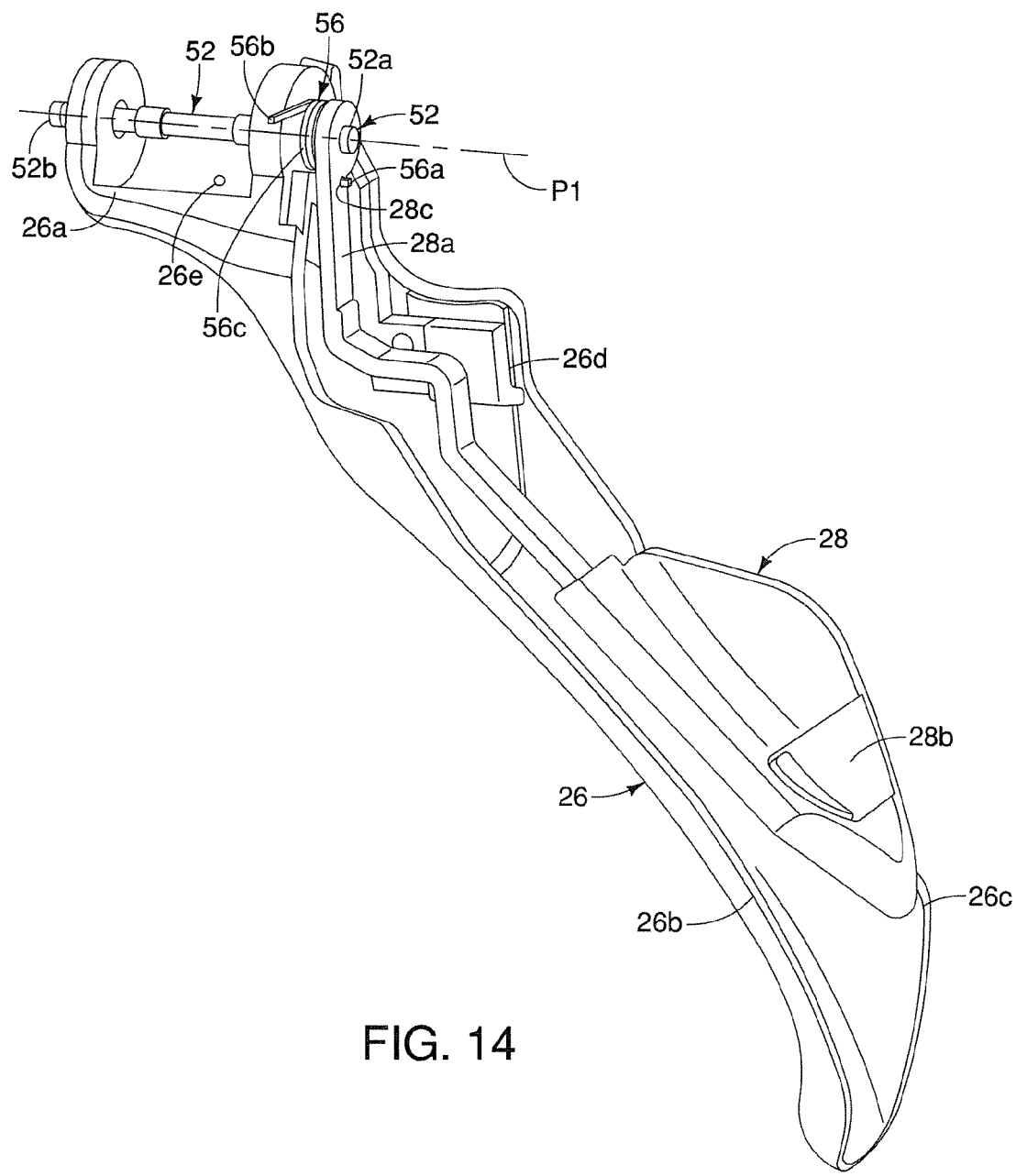
FIG. 14 is a rear perspective view of the first and second operating levers of the right bicycle control device illustrated in FIGS. 1 to 7, with the pivot axle for the first (brake/shift) operating lever removed to more clearly illustrate the pivot axle for the second (release) operating lever.
Figure 15:
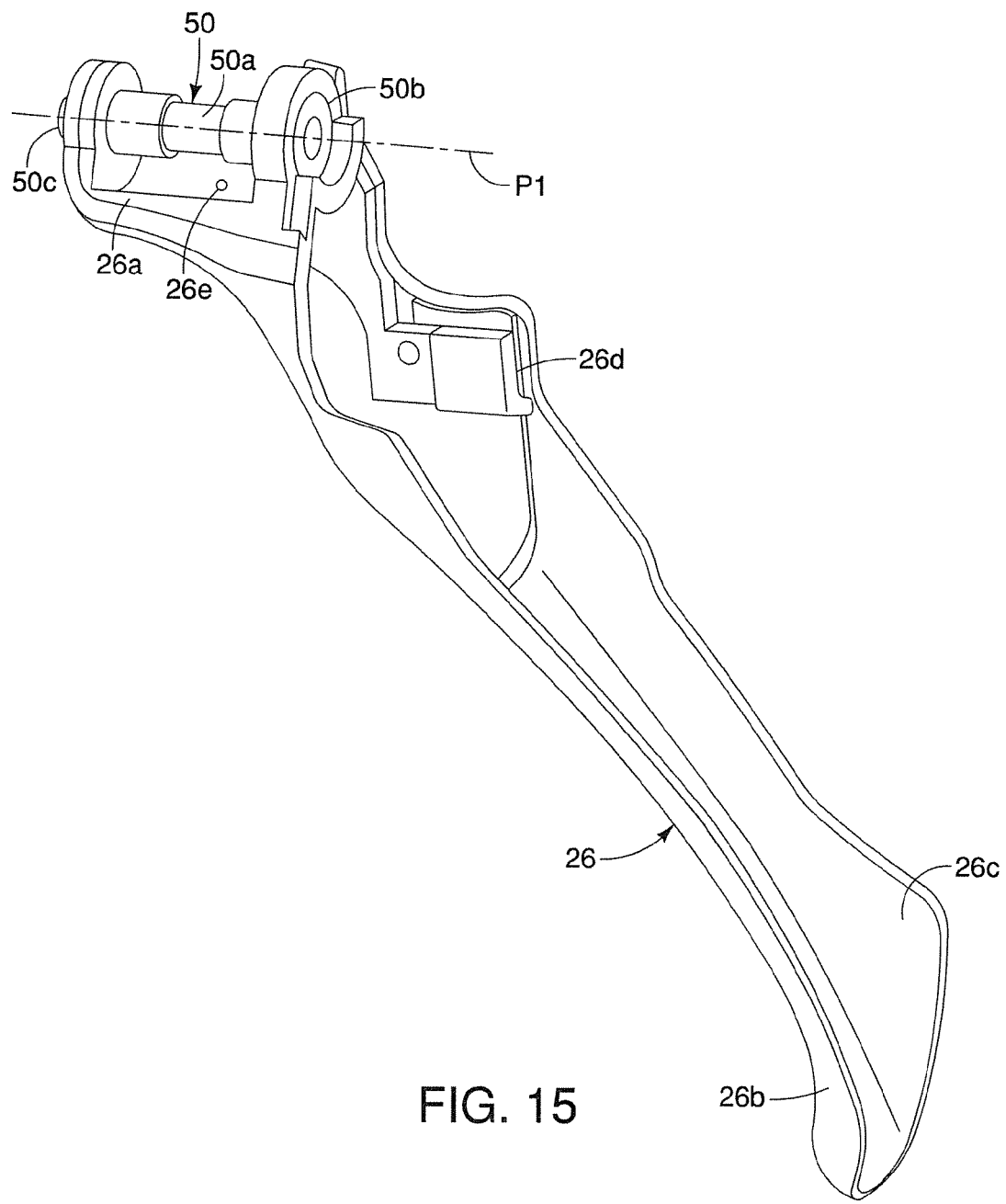
FIG. 15 is a rear perspective view of the first operating lever of the right bicycle control device illustrated in FIGS. 1 to 7, with the pivot axle for the second (release) operating lever removed to more clearly illustrate the pivot axle for the first (brake/shift) operating lever.

As seen in FIGS. 10 to 12, a first biasing member 54 is provided between the first operating lever 26 and the mounting member 40 for biasing the first operating lever 26 to its rest position. The first biasing member 54 biases the first operating lever 26 relative to the mounting member 40 about the shift pivot axis P1 toward a first direction D1. In the illustrated embodiment, the first biasing member 54 is a torsion spring that is disposed on a center section of the tubular shaft 50a of the first pivot axle 50. More specifically, the first biasing member 54 has a first end 54a that is disposed in a hole 26e of the first operating lever 26, and a second end 54b that is disposed in a hole 40d of the mounting member 40. The first biasing member 54 has its coiled portion 54c disposed on the tubular shaft 50a of the first pivot axle 50.

Similarly, as seen in FIGS. 10 to 12, a second biasing member 56 is provided between the second operating lever 28 and the mounting member 40 for biasing the second operating lever 28 to its rest position. The second biasing member 56 is arranged for biasing the second operating lever 28 relative to the first operating lever 26 about the shift pivot axis P1 toward the first direction D1. In the illustrated embodiment, the second the biasing member 56 is a torsion spring that is disposed on a lever attachment portion 52a of the second pivot axle 52 that extends out of one end of the tubular shaft 50a of the first pivot axle 50. The second operating lever 28 is fixedly attached to the lever attachment portion 52a such that the second operating lever 28 and the second pivot axle 52 rotate as a unit within the tubular shaft 50a of the first pivot axle 50. In the illustrated embodiment, as seen in FIG. 11, the second the biasing member 56 is threaded onto the lever attachment portion 52a of the second pivot axle 52. The second biasing member 56 has a first end 56a that is disposed in a hole 28c of the second operating lever 28, and a second end 56b that contacts the mounting member 40. The second biasing element 56 has its coiled portion 56c disposed on the lever attachment portion 52a of the second pivot axle 52.

The first and second pivot axles 50 and 52 will now be discussed in more detail with reference to FIGS. 11 to 15. The first pivot axle 50 is provided with a pair of bushings 58 such that the flanges 40a and 40b of the mounting member 40 pivotally supports the tubular shaft 50a of the first pivot axle 50 via the bushings 58. Thus, the first pivot axle 50 and the first operating lever 26 pivot together as a unit. In the illustrated embodiment, as seen in FIG. 11, the tubular shaft 50a has an enlarged head 50b at one end and an external thread 50c at the other end. The external thread 50c threadedly receives a nut 60. Thus, the first pivot axle 50 functions as a fastener for attaching the first operating lever 26 to the mounting member 40. Since the biasing element 44 biases the mounting member 40 to a stationary rest position with respect to the bracket 24, the first pivot axle 50 and the first operating lever 26 pivot together as a unit with respect to the bracket 24.

As mentioned above, the second operating lever 28 is attached to the second pivot axle 52, which is pivotally supported within the tubular shaft 50a of the first pivot axle 50. The second pivot axle 52 has a free end 52b with an annular groove for receiving a clip 62 at the end opposite to the lever attachment portion 52a of the second pivot axle 52. The second pivot axle 52 also has an enlarged head 52c formed adjacent the lever attachment portion 52a of the second pivot axle 52. Thus, the second pivot axle 52 is rotatably retained to the first pivot axle 50 by the clip 62 and the enlarged head 52c. Also with this arrangement, the mounting end 26a of the first operating lever 26 is located on the first pivot axle 50 between the clip 62 and the enlarged head 52c. In this way, the second pivot axle 52 is pivotally supported within the tubular shaft 50a of the first pivot axle 50 for relative pivotal movement with respect to the mounting member 40 and the bracket 24.

In the illustrated embodiment, as best seen in FIG. 11, the first biasing member 54 can be provided with a pair of cover members 64, if needed and/or desired. These cover members 64 aid in protecting the first biasing member 54 from contamination.

Figure 18:
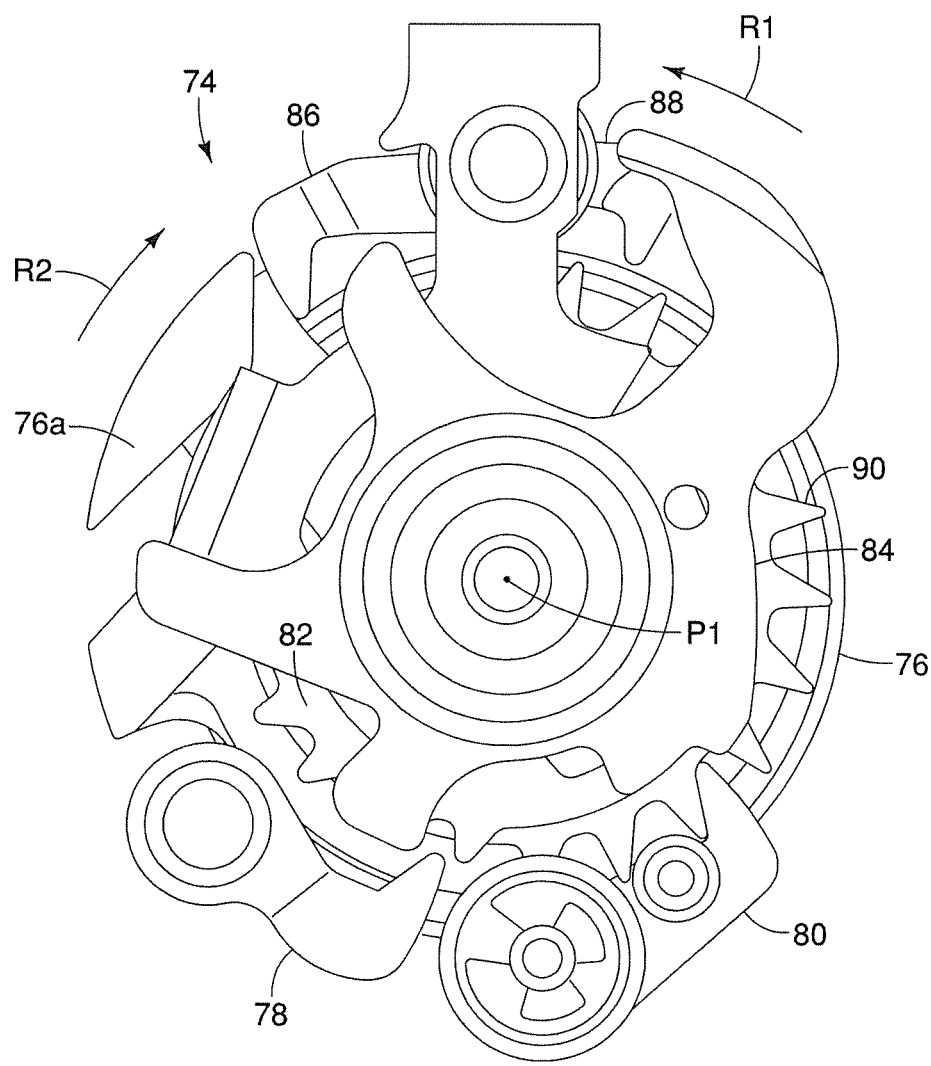
FIG. 18 is a front view of selected parts of the shift unit for the right bicycle control device illustrated in FIGS. 1 to 7 as viewed along the axis of the shift unit.

Referring now to FIGS. 16 to 18, the shift unit 30 will now be briefly discussed. However, as mentioned above, the shift unit 30 is not limited to the construction illustrated herein. Rather, the mounting arrangement of the first and second operating levers 26 and 28 to the bracket 24 can be used with other shift units. Thus, the shift unit 30 will not be discussed in great detail. The shift unit 30 is provided in the bracket 24 and has a pair of input members 70 and 72 extending out of the bracket 24 for being operated by the first and second operating levers 26 and 28. Specifically, the input member 70 is operated by the movement of the first operating lever 26 about the shift pivot axis P1 towards the bicycle longitudinal center plane for performing a shift operation. In FIG. 17, the input member 70 contacts the abutment 26d of the first operating lever 26. The input member 72 is operated by the movement of the second operating lever 28 about the shift pivot axis P1 towards the bicycle longitudinal center plane for performing a shift operation. Thus, the first and second operating levers 26 and 28 are operatively connected to the shift unit 30 for performing shifting operations.

In the illustrated embodiment, the shift unit 30 is a cable operated unit, which typically includes a positioning mechanism 74 that controls the position of a wire takeup member 76. The wire takeup member 76 constitutes one example of a winding member of the shift unit 30. Other parts of the shift unit 30 that move as the inner wire 21a moves can also constitute a winding member of the shift unit 30. The wire takeup member 76 is pivotally mounted relative to the bracket 24, and has a cable attachment structure 76a for attaching a nipple of the inner wire 21a thereto. The first operating lever 26 operates the shift unit 30 such that the wire takeup member 76 pivots in a first pivot direction R1, which corresponds to a cable pulling or winding direction of the wire takeup member 76. The second operating lever 28 operates the shift unit 30 such that the wire takeup member 76 pivots in a second pivot direction R2 of the wire takeup member 76 that is opposite the first pivot direction R1, which corresponds to a cable releasing direction of the wire takeup member 76.

In the illustrated embodiment, the input member 70 has a winding pawl 78 that is configured and arranged to operate the positioning mechanism 74 such that the wire takeup member 76 pivots in the first pivot direction R1. On the other hand, the input member 72 has a release pawl 80 that is configured and arranged to operate the positioning mechanism 74 such that the wire takeup member 76 pivots in the second pivot direction R2. In the illustrated embodiment, the positioning mechanism 74 has a winding plate 82, a release plate 84, a positioning pawl 86, a stop pawl 88 and a positioning plate 90. The winding plate 82 and the positioning plate 90 are fixed to the wire takeup member 76 such that they move together as a unit. The winding plate 82 includes a plurality of winding teeth that are selectively engaged by the winding pawl 78 to pivot the wire takeup member 76 in the first pivot direction R1. The positioning plate 90 includes a plurality of positioning teeth that are selectively engaged by the positioning pawl 86 to hold the wire takeup member 76 in a shifted position after the first and second operating levers 26 and 28 are operated and released. The release plate 84 is rotated by the release pawl 80 in the first pivot direction R1 such that the positioning pawl 86 and the stop pawl 88 are selectively engaged and disengaged from the positioning plate 90 to release the positioning plate 90 for movement in the second pivot direction R2.

In understanding the scope of the present invention, the term "comprising" and its derivatives, as used herein, are intended to be open ended terms that specify the presence of the stated features, elements, components, groups, and/or integers, but do not exclude the presence of other unstated features, elements, components, groups, and/or integers. The foregoing also applies to words having similar meanings such as the terms, "including", "having" and their derivatives. As used herein to describe the above embodiment(s), the following directional terms "forward", "rearward", "top", "bottom", "above", "below", "downward", "vertical", "horizontal", "inner", "outer" and "transverse" as well as any other similar directional terms refer to those directions of a bicycle equipped with the bicycle control device on a flat horizontal surface. Accordingly, these terms, as utilized to describe the bicycle control device should be interpreted relative to a bicycle equipped with the bicycle control device as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Components that are shown directly connected or contacting each other can have intermediate structures disposed between them. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device comprising:
   a bracket;
   a first lever pivotally mounted to the bracket on a first pivot axle to pivot about a first pivot axis defined by the first pivot axle; and
   a second lever pivotally mounted to the bracket on a second pivot axle to pivot about a second pivot axis defined by the second pivot axle, the second pivot axle being disposed inside the first pivot axle, the second lever being disposed on the second pivot axle at a location axially spaced from the first pivot axle with respect to the first pivot axis and the second pivot axle being configured to pivot with respect to the bracket;
   a first biasing member biasing the first lever relative to the bracket about the first pivot axis toward a first direction; and
   a second biasing member biasing the second lever relative to the bracket about the second pivot axis toward the first direction.

2. The bicycle control device according to claim 1, further comprising
   a mounting member pivotally attached to the bracket, the first and second pivot axles being supported on the mounting member.

3. The bicycle control device according to claim 1, further comprising
   a shift unit provided in the bracket, the first and second levers being operatively connected to the shift unit.

4. The bicycle control device according to claim 1, wherein
   the shift unit includes a winding member pivotally mounted relative to the bracket, the first lever operates the shift unit such that the winding member pivots in a first pivot direction of the winding member, and the second lever operates the shift unit such that the winding member pivots in a second pivot direction of the winding member that is opposite the first pivot direction of the winding member.

5. The bicycle control device according to claim 1, wherein the first and second pivot axes are coincident.

6. The bicycle control device according to claim 1,
   the first pivot axle includes a tubular shaft, and
   the second pivot axle has a lever attachment portion that extends out of one end of the tubular shaft with the second lever attached to the lever attachment portion.

7. The bicycle control device according to claim 1, wherein
   the first lever and the first pivot axle are configured to pivot together as a unit with respect to the bracket.

8. A bicycle control device comprising:
   a bracket;
   a first lever pivotally mounted to the bracket on a first pivot axle to pivot about a first pivot axis defined by the first pivot axle;
   a second lever pivotally mounted to the bracket on a second pivot axle to pivot about a second pivot axis defined by the second pivot axle, the second pivot axle being disposed inside the first pivot axle, the second lever being disposed on the second pivot axle at a location axially spaced from the first pivot axle with respect to the first pivot axis, and the second lever moving together with the first lever as the first lever is operated;
   a first biasing member biasing the first lever relative to the bracket about the first pivot axis toward a first direction; and
   a second biasing member biasing the second lever relative to the bracket about the second pivot axis toward the first direction.

9. A bicycle control device comprising:
   a bracket;
   a first lever pivotally mounted to the bracket on a first pivot axle to pivot about a first pivot axis defined by the first pivot axle;
   a second lever pivotally mounted to the bracket on a second pivot axle to pivot about a second pivot axis defined by the second pivot axle, the second pivot axle being disposed inside the first pivot axle;
   a first biasing member biasing the first lever relative to the bracket about the fi pivot axis toward a first direction; and
   a second biasing member biasing the second lever relative to the bracket about the second pivot axis toward the first direction, the first biasing member including a first torsion spring having a coil portion disposed on the first pivot axle, and
   the second biasing member including a second torsion spring having a coil portion disposed on the second pivot axle.

10. The bicycle control device according to claim 9, wherein
    the first lever and the first pivot axle are configured to pivot together as a unit with respect to the bracket.

11. A bicycle control device comprising:
    a bracket;
    a first lever pivotally mounted to the bracket on a first pivot axle to pivot about a first pivot axis defined by the first pivot axle, the first pivot axle including a tubular shaft;
    a second lever pivotally mounted to the bracket on a second pivot axle to pivot about a second pivot axis defined by the second pivot axle, the second pivot axle being disposed inside the first pivot axle, and having a lever attachment portion that extends out of one end of the tubular shaft with the second lever attached to the lever attachment portion, the second lever being disposed on the second pivot axle at a location axially spaced from the first pivot axle with respect to the first pivot axis; and
    a mounting member pivotally attached to the bracket, the mounting member having a pair of attachment flanges that pivotally support the tubular shaft, and the second pivot axle being pivotally supported within the tubular shaft relative to the mounting member.

12. The bicycle control device according to claim 11, further comprising
    a first biasing member biasing the first lever relative to the bracket about the first pivot axis toward a first direction; and
    a second biasing member biasing the second lever relative to the bracket about the second pivot axis toward the first direction.

13. The bicycle control device according to claim 12, wherein
    the first biasing member includes a first torsion spring having a coil portion disposed on the tubular shaft of the first pivot axle between the pair of attachment flanges of the bracket, and the second biasing member includes a second torsion spring having a coil portion disposed on the lever attachment portion of the second pivot axle.

* * * * *